(12) United States Patent
Kirchev et al.

(10) Patent No.: US 8,609,267 B2
(45) Date of Patent: Dec. 17, 2013

(54) ELECTROCHEMICAL CELL WITH AN ELECTROLYTE FLOW, COMPRISING THROUGH-ELECTRODES AND PRODUCTION METHOD

(75) Inventors: Angel Zhivkov Kirchev, Aix-les-Bains (FR); Nina Kircheva, Aix-les-Bains (FR)

(73) Assignee: Comissariat a l'Energie Atomique et aux Energies Alternatives, Paris (FR)

( * ) Notice: Subject to any disclaimer, the term of this patent is extended or adjusted under 35 U.S.C. 154(b) by 31 days.

(21) Appl. No.: 13/255,680

(22) PCT Filed: Mar. 23, 2010

(86) PCT No.: PCT/EP2010/053750
§ 371 (c)(1),
(2), (4) Date: Sep. 9, 2011

(87) PCT Pub. No.: WO2010/115703
PCT Pub. Date: Oct. 14, 2010

(65) Prior Publication Data
US 2011/0318617 A1    Dec. 29, 2011

(30) Foreign Application Priority Data

Apr. 6, 2009   (FR) ..................... 09 01667

(51) Int. Cl.
*H01M 2/40* (2006.01)
*H01M 4/00* (2006.01)
*H01M 4/02* (2006.01)
*H01M 4/13* (2010.01)
*H01M 4/82* (2006.01)

(52) U.S. Cl.
USPC ............. 429/70; 429/128; 429/209; 29/623.1

(58) Field of Classification Search
USPC ......... 429/128–131, 137–138, 146–147, 161, 429/208–209, 211, 218.1, 231.4, 231.8, 70; 29/623.1–623.5
See application file for complete search history.

(56) References Cited

U.S. PATENT DOCUMENTS

| | | |
|---|---|---|
| 3,825,460 A | 7/1974 | Yoshikawa et al. |
| 5,451,444 A | 9/1995 | DeLiso et al. |

(Continued)

FOREIGN PATENT DOCUMENTS

| | | |
|---|---|---|
| DE | 2 203 592 | 11/1972 |
| EP | 0 856 900 A2 | 8/1998 |
| WO | WO 01/15792 A1 | 3/2001 |
| WO | WO 2006/105188 A1 | 10/2006 |

OTHER PUBLICATIONS

Butler, P.C. et al., "Zinc/Bromine Batteries," *Handbook of Batteries*, 2002, Chapter 39, pp. 39.1-39.22, 3rd Ed.

(Continued)

*Primary Examiner* — Barbara Gilliam
*Assistant Examiner* — Claire L Roe
(74) *Attorney, Agent, or Firm* — Oliff & Berridge, PLC

(57) ABSTRACT

An electrochemical cell comprises an inlet and an outlet for an electrolyte flow, and two unipolar electrodes. Each electrode comprises a structure with a network of through-passages, surrounded by a solid frame. The electrolyte enters via inlets, circulates via the passages of the electrodes, passes through the space between the electrodes and leaves via an outlet. The structure and the frame are based on carbon.

11 Claims, 4 Drawing Sheets

(56) References Cited

U.S. PATENT DOCUMENTS

| | | | |
|---|---|---|---|
| 5,980,855 A * | 11/1999 | Shackle et al. | 423/594.8 |
| 2005/0084737 A1 | 4/2005 | Wine et al. | |
| 2005/0191555 A1 | 9/2005 | Kelley et al. | |
| 2006/0292448 A1 * | 12/2006 | Gyenge et al. | 429/236 |

OTHER PUBLICATIONS

International Search Report issued in International Application No. PCT/EP2010/053750, Jun. 1, 2010.

Oct. 18, 2011 International Preliminary Examination Report and Written Opinion issued in International Application No. PCT/EP2010/053750.

Gyenge et al., "Electroplated Reticulated Vitreous Carbon Current Collectors for Lead-Acid Batteries: Opportunities and Challenges," Journal of Power Sources, vol. 113, pp. 388-395, 2003.

Faber, "The Use of Titanium in the Lead Acid," Power Sources 4, ed. D.H. Collins, pp. 525-538, 1973.

Bode, "Lead-Acid Batteries," John Wiley & Sons, pp. 150-159, 1977.

Takahashi et al., "Physical Changes in Positive Active Mass During Deep Discharge-Charge Cycles of Lead-Acid Cell," J. Electrochem. Soc., vol. 130, No. 11, pp. 2144-2149, Nov. 1983.

U.S. Appl. No. 13/256,322 filed in the name of Angel Zhirkov Kirchev et al., May 8, 2012.

Oct. 18, 2011 International Preliminary Examination Report and Written Opinion issued in International Application No. PCT/EP2010/053771.

International Search Report issued in International Application No. PCT/EP2010/053771, Jun. 14, 2010.

* cited by examiner

ELECTROCHEMICAL CELL WITH AN ELECTROLYTE FLOW, COMPRISING THROUGH-ELECTRODES AND PRODUCTION METHOD

BACKGROUND OF THE INVENTION

The invention relates to an electrochemical cell with an electrolyte flow, comprising at least two electrodes having parallel flat main faces, each electrode comprising a structure with a network of through-passages perpendicular to the main faces of the electrode.

The invention also relates to a production method of such a cell.

STATE OF THE ART

This type of cell is suitable for storage applications such as batteries. In a first type of electrochemical battery with electrolyte flow, redox flow cells, the species that take part in the electrochemical reactions are completely dissolved in the electrolyte. This is in particular the case of vanadium batteries.

The article "Handbook of Batteries" by Paul C. Butler et al. (3rd ed., chapter 39 "Zinc/Bromine Batteries", 2002) describes a Zinc/Bromine battery in which one of the electrochemical species is deposited in the form of a solid layer of zinc. FIG. 1 represents one of these cells. It comprises at least two bipolar electrodes 1 and 2, made from a composite material which is carbon-based and polymer-based, formed by injection moulding. A polymer separator 3 is placed between the two electrodes when the cell uses two electrolytes. One surface of the separator is thereby in contact with a cathodic electrolyte and the other surface is in contact with an anodic electrolyte. This cell is supplied by a vertical electrolyte flow, i.e. a flow that is parallel to the main faces of electrodes 1 and 2. In this configuration, the power of the cell is proportional to the geometric surface of the electrodes in contact with the associated electrolyte. Fabrication of high-power cells is then difficult on account of the large size of the electrodes. Furthermore, pumping in large cells is difficult. Another shortcoming of this technology is degradation of the composite material structures when ageing of the battery takes place.

An electrochemical cell comprising two parallel flat electrodes has been proposed in US Patent application 2005/084737. Each electrode comprises a plurality of through-passages for circulation of an electrolyte.

Patent application WO01/15792 further describes an electrode for deionization of water. The water flows in pores from one surface of the electrode to the other.

These electrodes nevertheless present a low resistance to mechanical stresses and a limited current conduction.

OBJECT OF THE INVENTION

The object of the invention is to provide an electrochemical cell and a production method of an electrochemical cell remedying the shortcomings of the prior art. More particularly, the object of the invention is to provide a solid and compact electrochemical cell that is easy to produce, while at the same time having a high efficiency.

According to the invention, this object is achieved by the appended claims.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS

Figure 1:
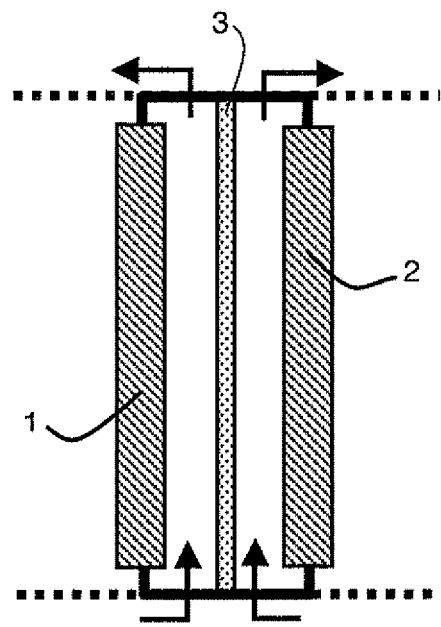
FIG. 1 represents an electrochemical cell according to the prior art.
Figure 2:
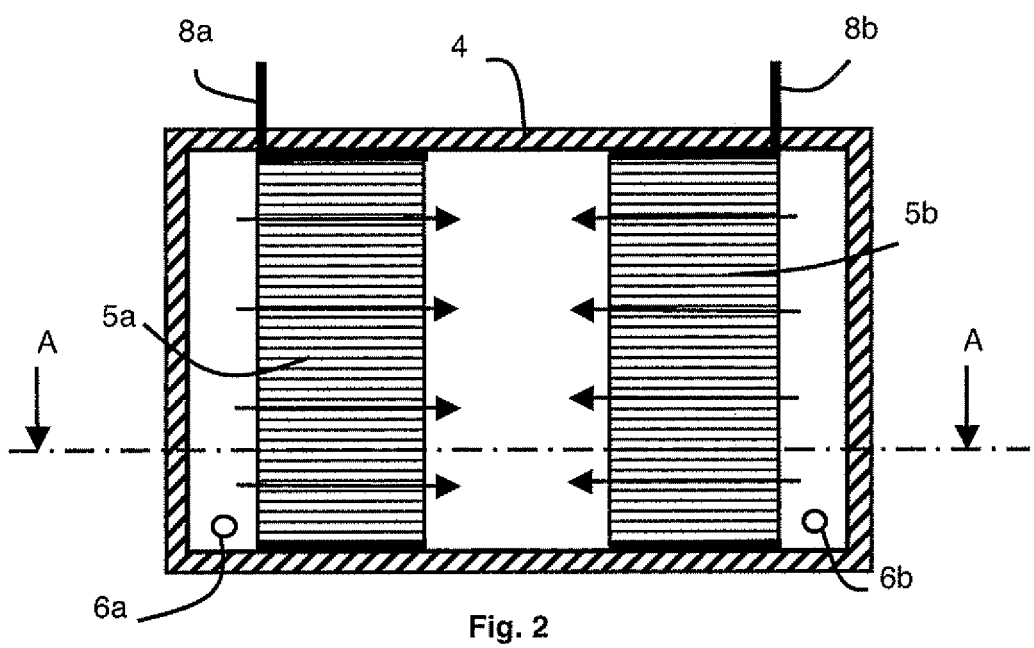
FIG. 2 schematically represents a cell according to the invention using a single electrolyte, in cross-sectional view.
Figure 3:
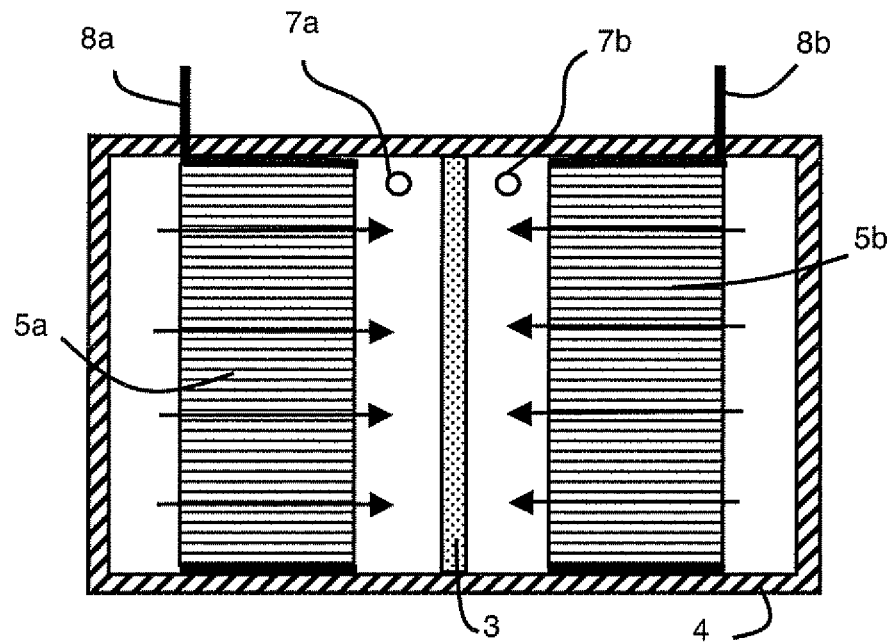
FIG. 3 schematically represents a cell according to the invention using two electrolytes, in cross-sectional view.

FIG. 2 illustrates a particular embodiment of an electrochemical cell with an electrolyte flow according to the invention, in cross-sectional view. The cell conventionally comprises two electrodes 5a and 5b, which may be separated by a separator 3, housed in an enclosure 4 (FIG. 3). The cell comprises at least two distinct inlets, each inlet being associated with an electrode, and at least one outlet. Two inlet openings 6a and 6b formed in the front wall of enclosure 4 are represented in FIG. 2, and two outlet openings 7a and 7b, formed in the rear wall of enclosure 4 are represented in FIG. 3. In FIG. 2, the electrolyte enters the volume comprised between electrode 5a and the corresponding wall of enclosure 4 via inlet opening 6a. In similar manner, the electrolyte enters the volume comprised between electrode 5b and the corresponding wall of enclosure 4 via inlet opening 6b. Each electrode comprises a structure 9 (FIG. 4) with a network of through-passages extending from one main face to the other. The passages are perpendicular to the main faces of the electrode. They are preferably all identical and separated by thin walls of low porosity (porosity: 5-10%). The cross-section of each passage can be circular, hexagonal, square, rectangular, etc. The network formed in this way is preferably a regular network, for example in the form of a honeycomb.

The electrolyte thus flows via the passages from electrodes 5a and 5b, passes through the volume comprised between electrodes 5a and 5b and leaves via an outlet opening that is not represented in FIG. 2. In the particular embodiment of FIG. 3, with separator 3, a first electrolyte enters via inlet opening 6a, passes through electrode 5a and exits via a first outlet opening 7a. In similar manner, a second electrolyte enters via inlet opening 6b, passes through electrode 5b and exits via a second outlet opening 7b. Finally, metallic collectors 8a and 8b carry the current to the outside of the cell and constitute the positive and negative terminals of the cell. Inlet openings 6a and 6b are preferably situated in the bottom part of the front wall of enclosure 4, whereas outlet openings, 7a and 7b, are preferably situated in the top part of the opposite wall (rear wall).

Figure 4:
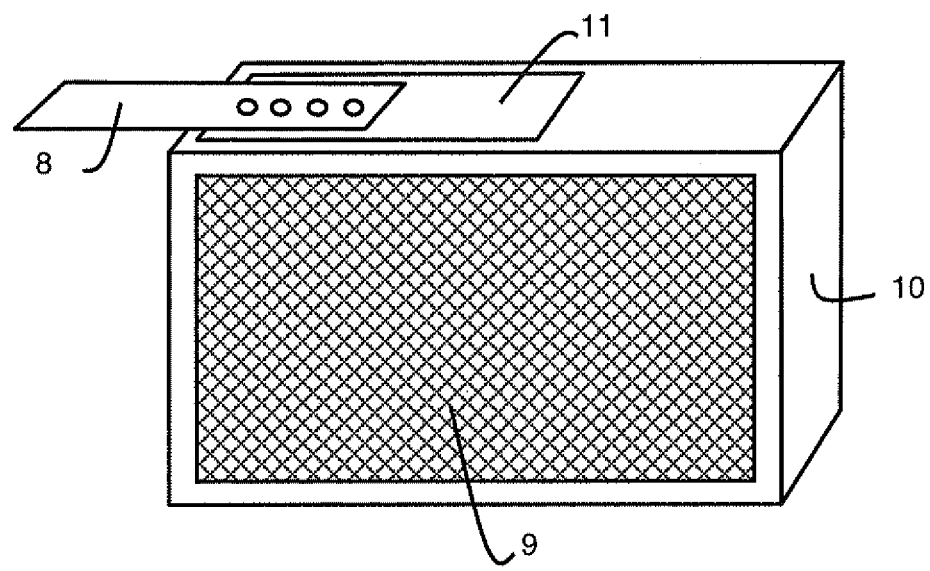
FIG. 4 represents a first embodiment of an electrode of a cell according to the invention.

FIG. 4 is a perspective view of an electrode comprising structure 9 in perspective. Structure 9 is surrounded by a bulky external frame 10, i.e that is compact and as little porous as possible. An area 11 of an outer face of frame 10 is metallized and a metallic current collector 8 is welded onto area 11. The other outer faces of frame 10 are preferably stuck to the inner walls of enclosure 4. In the case of an electrode of large dimensions, illustrated in FIG. 5, structure 9 is preferably divided into smaller elementary structures, four in FIG. 5 (9a, 9b, 9c and 9d), separated by an inner frame 12.

Structure 9 and solid external frame 10 are preferably carbon-based, for example made from vitreous carbon. The passages being ordered and homogeneous, the distribution of the electrolyte flow in the network is also homogeneous, in particular for passages with a size (diameter or side) of 1 mm to 4 mm and a length of 10 to 20 mm. With these dimensions, the cell keeps an excellent throwing power over the whole length of the passage. The throwing power represents the distribution of the current density along a passage and generally depends on two parameters: the electrostatic potential and the reactant concentration. The reactant concentration decreases the greater the distance from the passage inlet, because of the reactions which consume the reactants. On the contrary, the potential decreases in the opposite direction on account of the ohmic and electrostatic effects. These two parameters therefore vary in opposite directions. The current density, which results from the combination of these two parameters, is therefore almost homogeneous along a passage. The active surface of this cell thus participates in homogeneous manner in the electrochemical charging and discharging processes.

In a particular embodiment, the main face of structure 9 of each electrode is a square with sides of 24 cm and structure 9 has a thickness of 2 cm. The passages have a square cross-section with sides of 1 mm, separated by walls with a thickness of 0.2 mm. The number of passages formed in the structure of the electrode is then 40,000. The inner surfaces of each passage in contact with the electrolyte correspond to 0.8 $cm^2$ and the total active surface of the network is then 32,000 $cm^2$. With a frame 10 with a thickness of 0.5 cm, the cell measures 25×25 cm with a thickness of 6 cm. The volume of the cell is then 3,750 $cm^3$. The ratio between the active surface of the two electrodes and the volume of the cell is then 17 $cm^2/cm^3$, i.e. 8.5 times more than a cell with bipolar electrodes according to the prior art. In a cell according to the prior art having a cross-section of 24×24 cm and a thickness of 1 cm, the surface in contact of an electrode is in fact 576 $cm^2$ for a cell volume of 576 $cm^3$. The ratio of the active surface of the two electrodes over the cell volume is in this case 2 $cm^2/cm^3$. The cell according to the invention therefore presents a contact surface that is 8.5 times greater than a cell with the bipolar configuration of the same volume.

Figure 6:
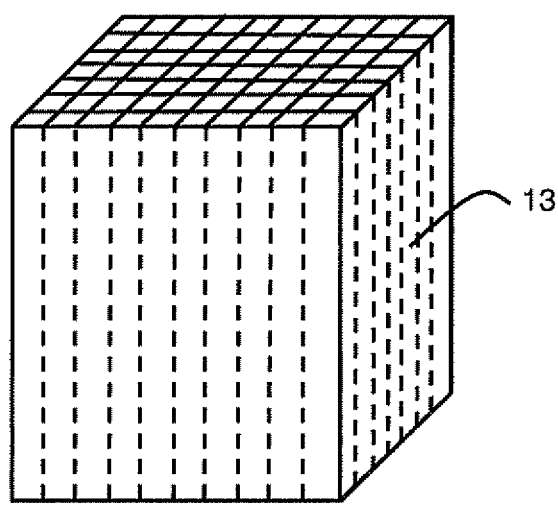
FIGS. 6 and 7 represent different steps of a production method of electrodes of a cell according to FIG. 2 or 4.

Structure 9 of the cell described in the foregoing is preferably fabricated by means of a method described in U.S. Pat. No. 3,825,460. Paper tubes are thus impregnated with at least one carbon-based thermosetting resin and then arranged to form a temporary resin-impregnated paper support 13 comprising the network of passages, as illustrated in FIG. 6. The resin is carbonizable, i.e. able to be transformed into carbon by heat treatment. The resin is hardened, for example by a hardener mixed with the resin or by heating to 60° C. Heat treatment is performed to transform the structure comprising said carbon network. Resin-impregnated paper supports are available on the market at low cost, in particular with a passage size (diameter or side) of 1 to 4 mm and walls with a thickness of about 0.1 mm.

This carbon structure as described in U.S. Pat. No. 3,825,460 would not be directly usable as an electrode. The current-carrying capacity on the perimeter of the structure is not in fact sufficient to collect all of the current generated in the structure. Furthermore, the side walls of the structure do not have sufficient strength for integration in an electrochemical cell. The outer walls of the structure further do not provide suitable means for fixing a current collector.

Figure 7:
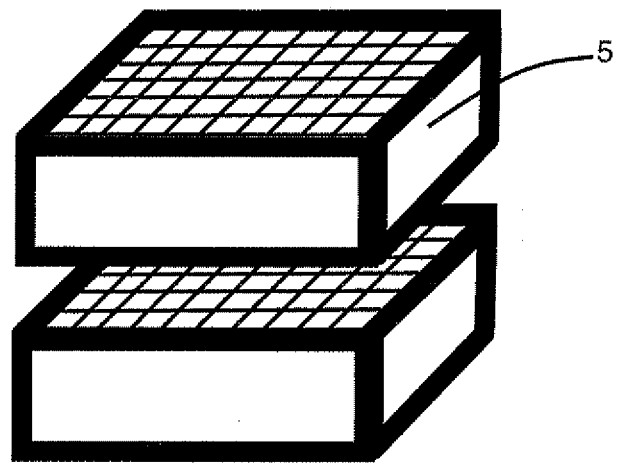

As indicated in the foregoing, the structure obtained in this way is consolidated by a solid frame formed around its outer lateral faces. Before heat treatment is performed, support 13 is placed in a mould to form the frame using a mixture containing at least one carbon-based thermosetting resin and advantageously carbon fibers and a solvent. The inlets-outlets of the passages have been previously closed in order to prevent the mixture from entering the passages. This resin is preferably the same as the one used to impregnate temporary support 13. The concentration of carbon fibres varies, preferably from 1 to 10% of the weight of resin used, and the concentration of the solvent varies from 5 to 15% of the weight of resin used. These additives enable fast subsequent carbonization without creating defects in the frame. After the mixture has hardened, support 13 covered by its frame is taken out of the mould and then sliced to the required thickness for electrodes 5 (FIG. 7) using a band saw or any other similar equipment. After slicing has been performed, the outer surfaces of the frame are hardened to facilitate the steps of metallization of area 11 and of sticking of electrodes 5 in the cell. The next step is heat treatment of electrodes 5 formed in this way in an inert atmosphere at a temperature of 1000 to 1100° C. During this step, the carbon-based resin of structure 9 and the resin of the mixture of frame 10 are transformed into carbon, which is conductive, having an excellent chemical resistance and mechanical strength. The last step of formation of the electrode comprises electroplating of area zone 11 of an outer face of the frame with copper and consecutive welding of the metallic current collector 8.

Figure 5:
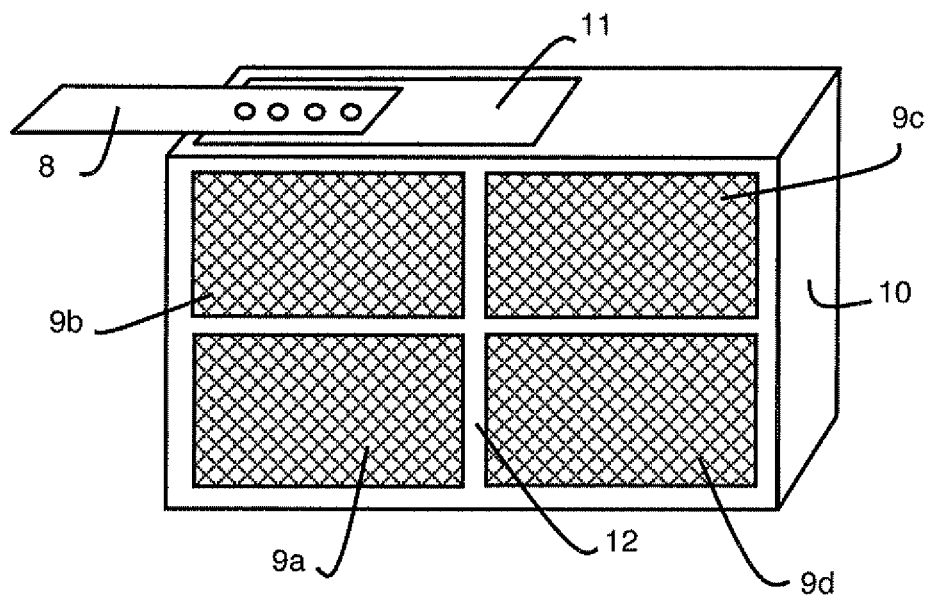
FIG. 5 represents a second embodiment of an electrode of a cell according to the invention.

In the case of electrodes of large dimensions, the ohmic resistance in the center of structure 9 can limit the performances of the cell, and slicing can give rise to physical defects in the structure. In such cases, the temporary support is then preferably divided into several blocks (FIG. 5). Spaces are left in the mould between the blocks, and are then filled by the mixture containing at least the thermosetting resin to form carbon-based inner frame 12.

Figure 8:
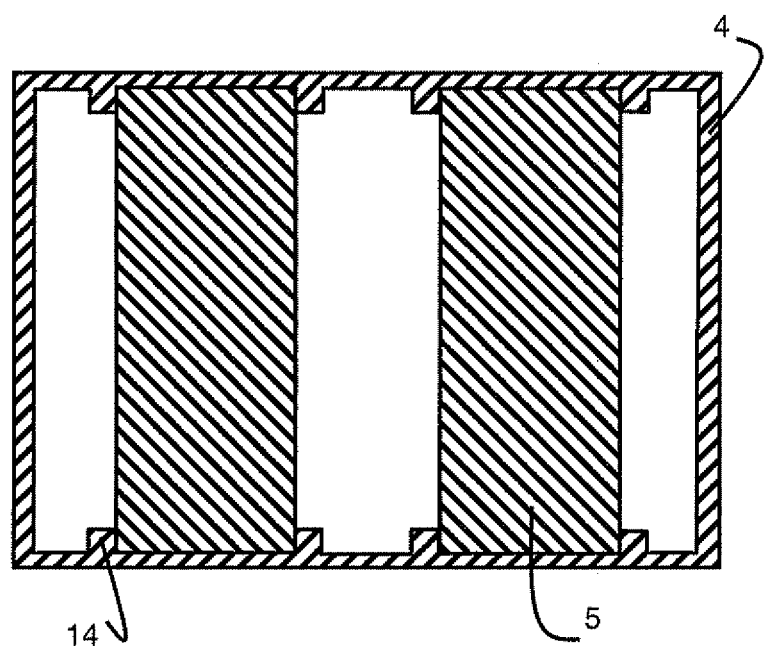
FIG. 8 schematically represents the cell according to FIG. 2, in cross-sectional view along A-A.

The electrochemical cell preferably comprises a cover which hermetically seals the cell. As illustrated in FIG. 8, enclosure 4 preferably comprises inner ribs 14 for positioning electrodes 5. Ribs 14 are for example situated on the two opposite side walls and on the bottom of the cell. A pair of separator-positioning ribs can be added in the case of a cell with a separator. The cell sealing steps are similar to those used for existing batteries with electrolyte flow.

The advantages of such a cell are the high ratio between the active surface and volume and the use of carbon structures with a higher chemical resistance and mechanical strength. Current carrying in the electrode is also improved, thereby increasing the efficiency of the cell.

The invention claimed is:

1. An electrochemical cell with an electrolyte flow comprising:
   an electrolyte, and
   at least two electrodes having parallel flat main faces, each electrode comprising a carbon-based structure with a network of through-passages extending from one main face of the parallel flat main faces to another main face of the parallel flat main faces and perpendicular to the main faces of said electrode,
   wherein
      the electrolyte passes through the at least two electrodes by flowing through the through-passages, and
      said structure comprises lateral faces surrounded by a carbon-based solid frame.

2. The cell according to claim 1, comprising at least two distinct inlets, each inlet being associated with an electrode, and at least one outlet.

3. The cell according to claim 1, wherein the frame is made from vitreous carbon.

4. The cell according to claim 1, wherein the electrode is divided into at least two parts by a carbon-based inner frame.

5. The cell according to claim 1, wherein the frame has at least one area of an outer face electroplated with copper and connected to a metallic current collector by welding.

6. The cell according to claim 1, wherein the network of passages is in the form of a honeycomb.

7. The cell according to claim 1, comprising an enclosure provided with inner ribs for positioning the electrodes.

8. A production method of a cell according to claim 1, wherein formation of the electrodes comprises:

making a temporary support impregnated with a first carbon-based thermosetting resin and comprising said network of passages, moulding the frame around said temporary support with a mixture comprising at least a second carbon-based thermosetting resin, hardening of said mixture, cutting into slices to form the electrodes, heat treatment to obtain the carbon-based structure and the carbon-based frame.

9. The method according to claim 8, wherein the temporary support is made from paper.

10. The method according to claim 8, wherein the mixture constituting the frame further comprises carbon fibers and an inert solvent.

11. The method according to claim 8, successively comprising electroplating of the area of an outer face of the frame with copper, and welding of a metallic current collector.

\* \* \* \* \*